US011959299B2

(12) United States Patent
Choi

(10) Patent No.: US 11,959,299 B2
(45) Date of Patent: Apr. 16, 2024

(54) DETACHABLE ILLUMINATION DEVICE AND TENT HAVING SAME

(71) Applicant: Campvalley (Xiamen) Co., Ltd., Xiamen (CN)

(72) Inventor: Kwan Jun Choi, Xiamen (CN)

(73) Assignee: Campvalley (Xiamen) Co., Ltd., Xiamen (CN)

( * ) Notice: Subject to any disclaimer, the term of this patent is extended or adjusted under 35 U.S.C. 154(b) by 101 days.

(21) Appl. No.: 17/743,985

(22) Filed: May 13, 2022

(65) Prior Publication Data

US 2023/0072321 A1 Mar. 9, 2023

(30) Foreign Application Priority Data

Sep. 6, 2021 (CN) ......................... 202122139830.0
Sep. 6, 2021 (CN) ......................... 202122155443.6

(51) Int. Cl.

| | |
|---|---|
| ***E04H 15/10*** | (2006.01) |
| ***E04H 15/02*** | (2006.01) |
| ***F21V 33/00*** | (2006.01) |

(52) U.S. Cl.
CPC ............. *E04H 15/10* (2013.01); *E04H 15/02* (2013.01); *F21V 33/006* (2013.01); *A45B 2200/1018* (2013.01)

(58) Field of Classification Search
CPC ... A45B 2200/1018; F21V 33/006; F21S 9/02
USPC .................................................. 135/91, 910
See application file for complete search history.

(56) References Cited

U.S. PATENT DOCUMENTS

| | | | | |
|---|---|---|---|---|
| 4,817,044 A | 3/1989 | Ogren | | |
| 6,089,727 A | 7/2000 | Wu | | |
| 6,435,691 B1 * | 8/2002 | Macey | .................... | F21S 8/024 362/240 |
| 6,439,249 B1 | 8/2002 | Pan | | |
| 6,773,140 B2 | 8/2004 | Lee | | |

(Continued)

FOREIGN PATENT DOCUMENTS

| | | |
|---|---|---|
| CN | 200949757 Y | 9/2007 |
| CN | 201924648 U | 8/2011 |

(Continued)

*Primary Examiner* — Robert Canfield
(74) *Attorney, Agent, or Firm* — MORGAN, LEWIS & BOCKIUS LLP

(57) ABSTRACT

A tent frame includes a detachable illumination device with a casing to house batteries, a light source to emit light, a coupler and a first cover. The casing includes a first member. The coupler includes a second member, and one or more electrically-conductive members for electrically connecting the batteries. The second member is movable relative to the first member in a first direction to facilitate engagement/disengagement of the coupler with/from the casing. The second member is immovable relative to the first member in a second direction to prevent the one or more electrically-conductive members from misaligning with the batteries. The first cover is movable relative to the coupler in the first and second directions. When connected to the casing, the first cover pushes the coupler in the first direction toward the batteries and presses the one or more electrically-conductive members against the batteries to ensure electrical connection.

20 Claims, 13 Drawing Sheets

(56) References Cited

U.S. PATENT DOCUMENTS

| | | | | |
|---|---|---|---|---|
| 7,311,113 | B2 | 12/2007 | Suh | |
| 7,455,427 | B1 | 11/2008 | Freeman | |
| 7,562,667 | B2 | 7/2009 | Li | |
| 2008/0000513 | A1* | 1/2008 | Yul | H02S 10/40 136/244 |
| 2008/0029141 | A1* | 2/2008 | Grand Pre | E04H 15/10 135/91 |
| 2008/0072945 | A1* | 3/2008 | Grand Pre | E04H 15/10 135/96 |
| 2009/0067165 | A1* | 3/2009 | Sanoner | F21V 21/096 362/398 |
| 2013/0271966 | A1 | 10/2013 | Doble | |
| 2015/0034137 | A1 | 2/2015 | Tanaeim | |
| 2016/0238205 | A1* | 8/2016 | Steigauf | F21V 23/003 |
| 2017/0292285 | A1* | 10/2017 | Jin | E04H 15/60 |
| 2018/0202185 | A1* | 7/2018 | Choi | F21V 23/002 |
| 2019/0338550 | A1* | 11/2019 | Zhu | F21V 33/006 |
| 2022/0064981 | A1* | 3/2022 | He | E04H 15/02 |
| 2022/0154917 | A1* | 5/2022 | Ma | F21V 21/22 |
| 2023/0127751 | A1* | 4/2023 | Qiu | F21L 4/02 362/184 |
| 2023/0189947 | A1* | 6/2023 | Luo | A45B 25/02 381/386 |

FOREIGN PATENT DOCUMENTS

| | | | | | |
|---|---|---|---|---|---|
| CN | 203684790 | U | | 7/2014 | |
| CN | 204492319 | U | | 7/2015 | |
| CN | 204627108 | U | | 9/2015 | |
| CN | 204691386 | U | | 10/2015 | |
| CN | 205025192 | U | | 2/2016 | |
| CN | 205591637 | U | | 9/2016 | |
| CN | 205743243 | U | | 11/2016 | |
| CN | 205840492 | U | | 12/2016 | |
| CN | 206035078 | U | | 3/2017 | |
| CN | 206035080 | U | | 3/2017 | |
| CN | 206360460 | U | * | 7/2017 | E04H 15/10 |
| WO | WO 2015/183926 | A1 | | 12/2015 | |

* cited by examiner

DETACHABLE ILLUMINATION DEVICE AND TENT HAVING SAME

CROSS-REFERENCE TO RELATED APPLICATIONS

The present application claims priority to Chinese Utility Model Applications CN 202122155443.6 filed Sep. 6, 2021 and CN 202122139830.0 filed Sep. 6, 2021. The disclosure of the application is incorporated herein for all purposes by reference in its entirety.

FIELD OF THE INVENTION

The present invention generally relates to detachable illumination devices, and to tent frames and tents having detachable illumination devices.

BACKGROUND

Most existing tents do not have illumination means. If illumination is desired, in particular at night, one often uses a separate lighting device (e.g., an illumination device). Individual lighting devices can be easily gotten lost or left behind.

Some existing tents have lighting devices integrated with the tents. However, addition of a lighting device often interferes with the folding and unfolding of the tent, making it inconvenient to use. Moreover, when folded, the tent is generally not compact and thus not easy to carry. Further, lighting devices of many existing tents are assembled using threads. This often causes the conductive springs of the lighting devices to become misaligned, resulting in open or short circuits.

Given the current state of the art, there remains a need for connectors, tent frames and tents that address the above-mentioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides detachable illumination devices, and tent frames and tents having detachable illumination devices.

In various exemplary embodiments, the present invention provides a tent frame having a detachable illumination device. The tent frame includes a plurality of tent poles, a hub connecting two or more tent poles in the plurality of tent poles, and an illumination device detachably connected to the hub. The illumination device includes a casing, a light source, a coupler and a first cover. The casing is configured to house a battery pack having a plurality of batteries. The casing also includes a first engagement member. The light source is configured to emit a light when electrically connected to the battery pack. The coupler includes a second engagement member corresponding to the first engagement of the casing, and one or more electrically-conductive elastic members for electrically connecting the plurality of batteries. The first cover is detachably connected to the casing. In addition, the second engagement member is movable with respect to the first engagement member in a first direction to facilitate engagement of the coupler with the casing or disengagement of the coupler from the casing. The second engagement member is immovable with respect to the first engagement member in a second direction to prevent the one or more electrically-conductive elastic members from misaligning with the plurality of batteries. The first cover is movable with respect to the coupler in the first and second directions. When connected to the casing, the first cover pushes the coupler in the first direction toward the battery pack, thereby pressing the one or more electrically-conductive elastic members against the plurality of batteries to ensure electrical connection.

In some exemplary embodiments, the tent frame includes an electrically-conductive probe disposed in the casing. When the first cover is connected to the casing, the electrically-conductive probe, together with the one or more electrically-conductive elastic members of the coupler, electrically connects the battery pack with the light source.

In some exemplary embodiments, the illumination device is detachably connected to the hub by fasteners, threads, snap-fitting, magnetic force, or any combination thereof.

In some exemplary embodiments, the hub includes a sleeve formed with an internal thread and the casing of the illumination device includes an external thread for detachably connecting the illumination device to the hub.

In an exemplary embodiment, the sleeve includes a circumferential groove recessed from an outer wall of the sleeve to receive an edge of a tent cloth to prevent wind or water leakage.

In some exemplary embodiments, each of the first and second engagement members is elongated in the first direction. When attached, the first and second engagement members are restricted from rotating relative to each other in the second direction.

In some exemplary embodiments, one of the first and second engagement members has a cross section with an exterior periphery and the other of the first and second engagement members has a cross section with an interior periphery that mates with the exterior periphery.

In an exemplary embodiment, the cross-section of the one of the first and second engagement members has a substantially water drop shape.

In some exemplary embodiments, the first cover is snap-fitted onto the casing.

In an exemplary embodiment, the casing includes one or more protrusions on an inner wall of the casing and the first cover includes one or more slots on an outer wall of the first cover for detachably connecting the first cover to the casing.

In some exemplary embodiments, the coupler includes a third engagement member, and the first cover includes a fourth engagement member that is movable relative to the third engagement member in the first and second directions.

In an exemplary embodiment, one of the third and fourth engagement members is a convex column and the other one of the third and fourth engagement members is a circular groove to receive the convex column when the first cover is connected to the casing.

In some exemplary embodiments, the tent frame further includes a second cover coupled with the casing to protect the light source. The second cover is at least partially transparent to the light emitted by the light source.

In some exemplary embodiments, the tent frame further includes a switch electrically connected to the light source to allow a user to control the light source.

In various exemplary embodiments, the present invention provides a tent frame having a detachable illumination device. An exemplary tent frame includes a plurality of tent poles, a hub connecting two or more tent poles in the plurality of tent poles, and an illumination device detachably connected to the hub. An exemplary illumination device includes a casing, a light source, a coupler, and a first coupler. The casing is configured to house a battery pack having a plurality of batteries. The casing also includes a first engagement member. The light source is configured to emit a light when electrically connected to the battery pack. An exemplary coupler includes a plate, a second engagement member extended downward from a lower side of the plate, one or more electrically-conductive elastic members coupled with the lower side of the plate, and a third engagement member extended upward from an upper side of the plate. The first cover is detachably connected to the casing. The first cover includes a fourth engagement member extended downward from a side of the first cover facing the coupler. In addition, the second engagement member is movable with respect to the first engagement member in a first direction to facilitate engagement or disengagement of the coupler with or from the casing. The second engagement member is immovable with respect to the first engagement member in a second direction to prevent the one or more electrically-conductive elastic members from misaligning with the plurality of batteries. When the first cover is connected to the casing, the fourth engagement member is engaged with the third engagement member to push the coupler in the first direction toward the battery pack, thereby pressing the one or more electrically-conductive elastic members against the plurality of batteries to ensure electrical connection.

In various exemplary embodiments, the present invention provides an illumination device for a tent frame with a plurality of tent poles and a hub connecting two or more tent poles in the plurality of tent poles. An exemplary illumination device includes a casing, a light source, a coupler, and a first cover. An exemplary casing is configured to detachably connect to the hub and house a battery pack having a plurality of batteries. An exemplary casing also includes a first engagement member. An exemplary light source is configured to emit a light when electrically connected to the battery pack. An exemplary coupler includes a plate, a second engagement member extended downward from a lower side of the plate, one or more electrically-conductive elastic members coupled with the lower side of the plate, and a third engagement member extended upward from an upper side of the plate. The first cover is detachably connected to the casing. The first cover includes a fourth engagement member extended downward from a side of the first cover facing the coupler. In addition, the second engagement member is movable with respect to the first engagement member in a first direction to facilitate engagement or disengagement of the coupler with or from the casing. The second engagement member is immovable with respect to the first engagement member in a second direction to prevent the one or more electrically-conductive elastic members from misaligning with the plurality of batteries. When the first cover is connected to the casing, the fourth engagement member is engaged with the third engagement member to push the coupler in the first direction toward the battery pack, thereby pressing the one or more electrically-conductive elastic members against the plurality of batteries to ensure electrical connection.

In some exemplary embodiments, the illumination device includes an electrically-conductive probe disposed in the casing. When the first cover is connected to the casing, the electrically-conductive probe, together with the one or more electrically-conductive elastic members of the coupler, electrically connects the battery pack with the light source.

In an exemplary embodiment, each of the first and second engagement members is elongated in the first direction. When attached, the first and second engagement members are restricted from rotating relative to each other in the second direction. One of the first and second engagement members has a cross section with an exterior periphery and the other of the first and second engagement members has a cross section with an interior periphery that mates with the exterior periphery.

In various exemplary embodiments, the present invention provides a tent. The tent includes a tent frame having a detachable illumination device disclosed herein, and a tent cloth coupled to the tent frame. In some exemplary embodiments, the hub of the tent frame includes a sleeve for detachably connecting the illumination device, and the tent cloth includes a hole to allow the sleeve of the hub to pass through. In an exemplary embodiment, the sleeve includes a circumferential groove on an outer wall of the sleeve and configured in accordance with the hole of the tent cloth to prevent wind or water leakage.

Exemplary illumination devices, tent frames, and tents of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention. The accompanying drawings are not necessarily to scale. The specific design features of the present invention as disclosed herein, including, for example, specific dimensions, orientations, locations, and shapes will be determined in part by the particular intended application and use environment. In addition, the components illustrated in the figures are combinable in any useful number and combination.

DETAILED DESCRIPTION

Figure 1:
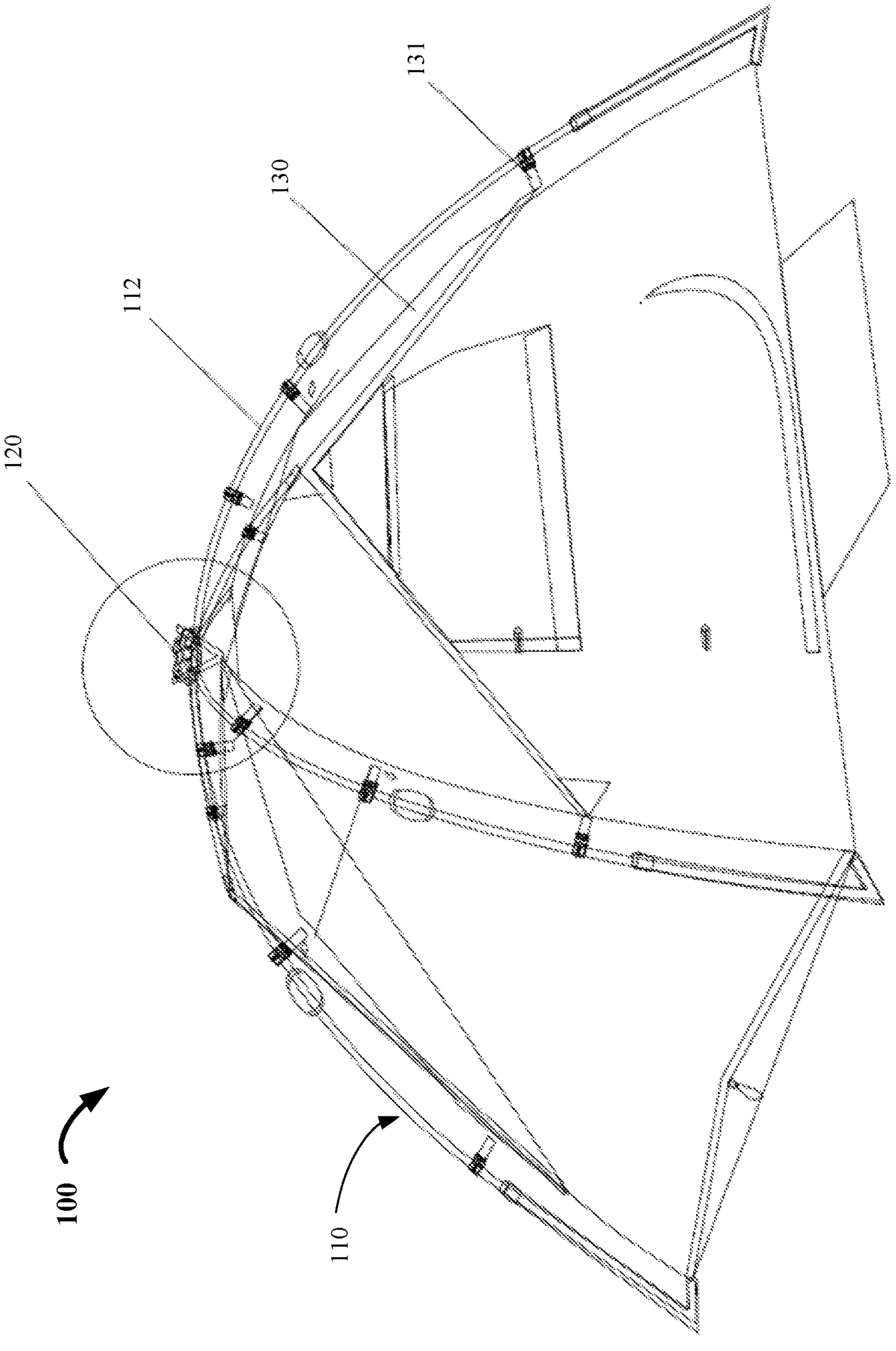
FIG. 1 is a perspective view schematically illustrating an exemplary tent in accordance with exemplary embodiments of the present invention.

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Exemplary embodiments of the present invention are described in the context of tents, tent frames, and detachable illumination devices for use with tents and tent frames. The tents and tent frames can be of various types, sizes and shapes, including but not limited to gazebos, domes, shelters and other types of tents.

Referring to FIGS. 1-5, there is depicted an exemplary tent, such as tent 100, in accordance with some exemplary embodiments of the present invention. As shown, tent 100 includes a tent frame, such as tent frame 110, and the tent frame includes a plurality of tent poles, such as tent pole 112. Depending on the types (e.g., gazebos, domes), sizes and shapes of the tent, the tent frame can have any suitable number of tent poles, including but not limited to three, four, five, six or more tent poles. In addition, a tent pole can be a single unitary tent pole, or made of two or more pole segments that are coupled (e.g., pivotally, telescopically, etc.) with each other. By way of example, four tent poles are illustrated.

Tent 100 also includes a tent cloth, such as tent cloth 130, coupled to and supported by one or more tent poles in the plurality of tent poles when the tent is unfolded. For instance, in some exemplary embodiments, the tent cloth is coupled to one or more tent poles of the tent frame by hooks 131 or the like.

In some exemplary embodiments, the plurality of tent poles are connected to each other by one or more connectors, and the one or more connectors includes a hub, such as exemplary hub 120. The hub can be configured to connect any suitable number of tent poles, e.g., two, three, four, five or more tent poles. In some exemplary embodiments, the hub is configured to connect some but not all of the tent poles of a tent. In some exemplary embodiments, the hub is configured to connect all of the tent poles of a tent. As a non-limiting example, FIG. 1 illustrates hub 120 connecting all four tent poles. While hub 120 in FIG. 1 is positioned at the center and on the top of the tent, it should be noted that a hub can be positioned in other places. For instance, a hub can be positioned at a side of a tent (e.g., gazebo) to connect two or more side poles, or at a corner of a tent (e.g., gazebo) to connect a vertical pole with one or more side poles.

Figure 2:
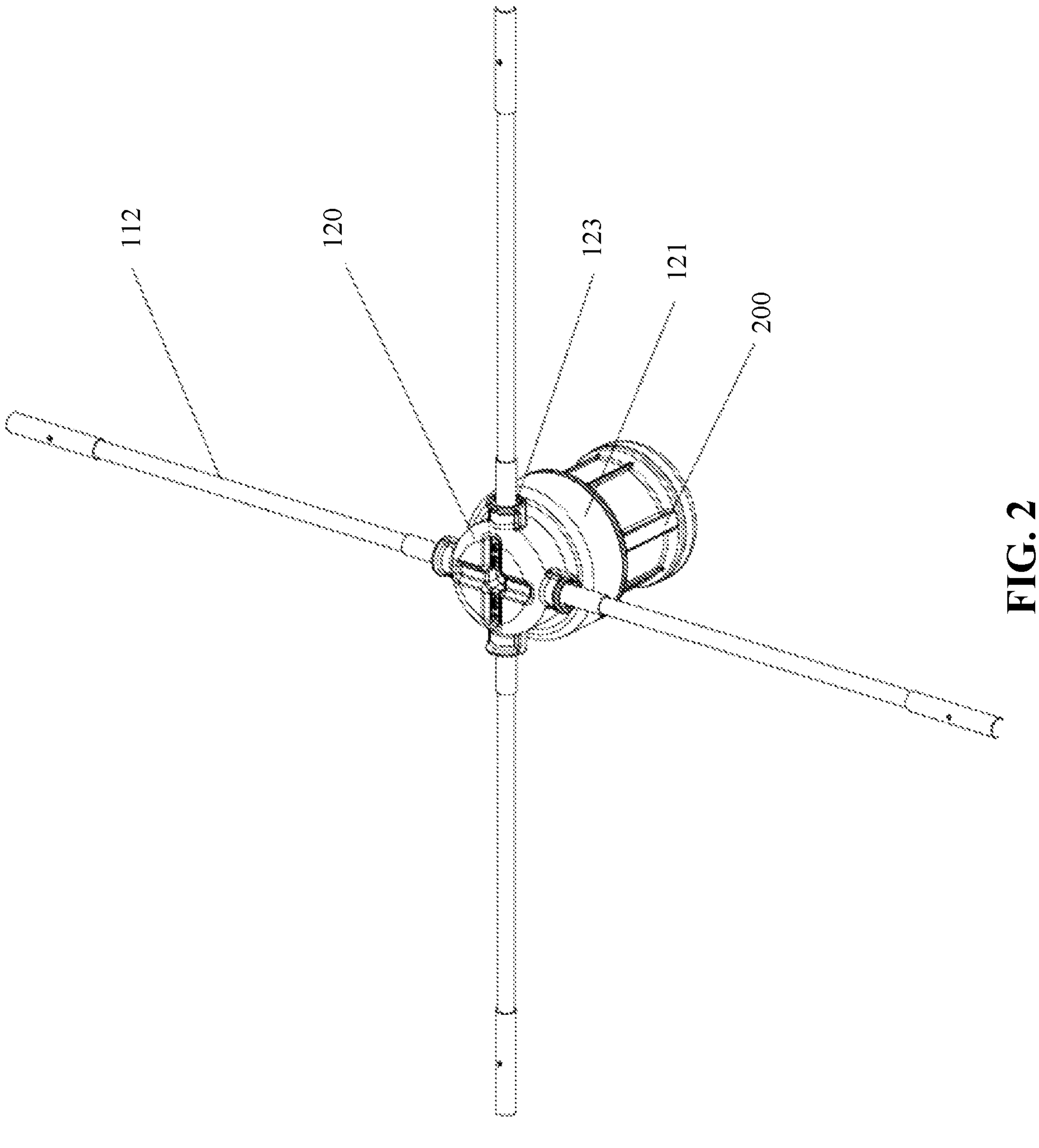
FIG. 2 is a perspective view schematically illustrating an exemplary illumination device and an exemplary hub engaged with each other in accordance with exemplary embodiments of the present invention.
Figure 3:
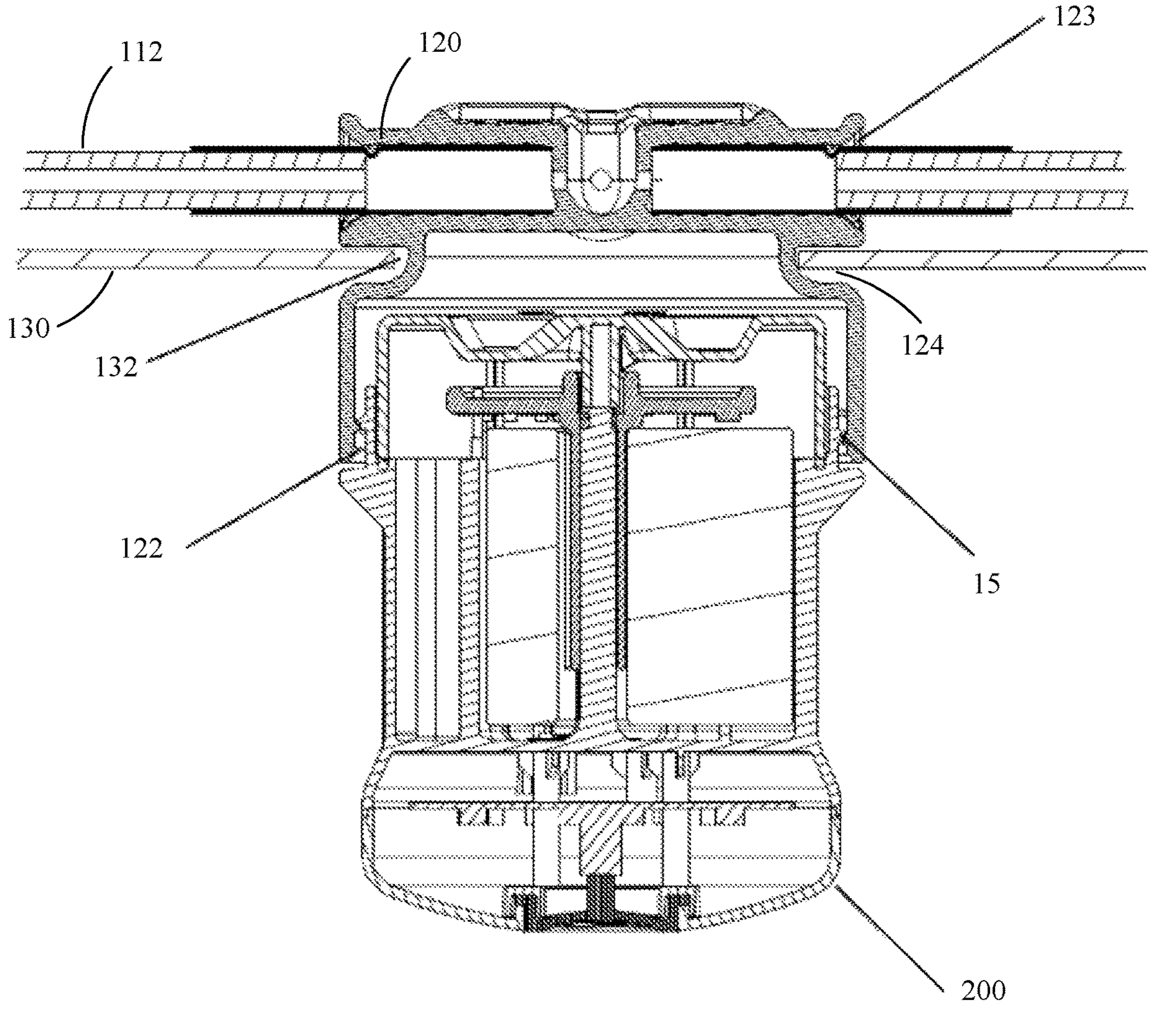
FIG. 3 is a cross-sectional view schematically illustrating the exemplary illumination device and hub of FIG. 2 engaged with each other in accordance with exemplary embodiments of the present invention.
Figure 4:
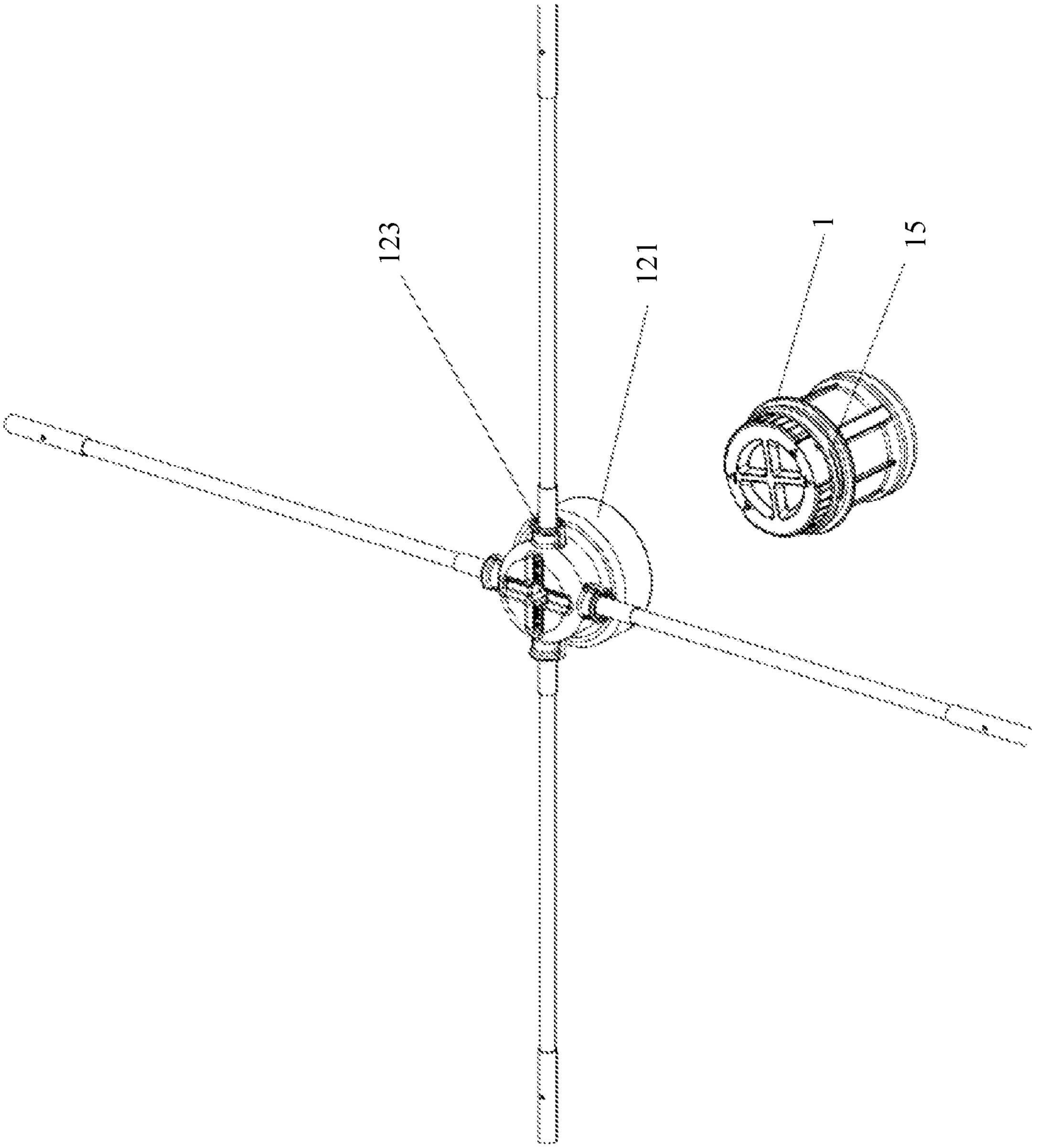
FIG. 4 is a perspective view schematically illustrating the exemplary illumination device and hub of FIG. 2 disengaged from each other in accordance with exemplary embodiments of the present invention.
Figure 5:
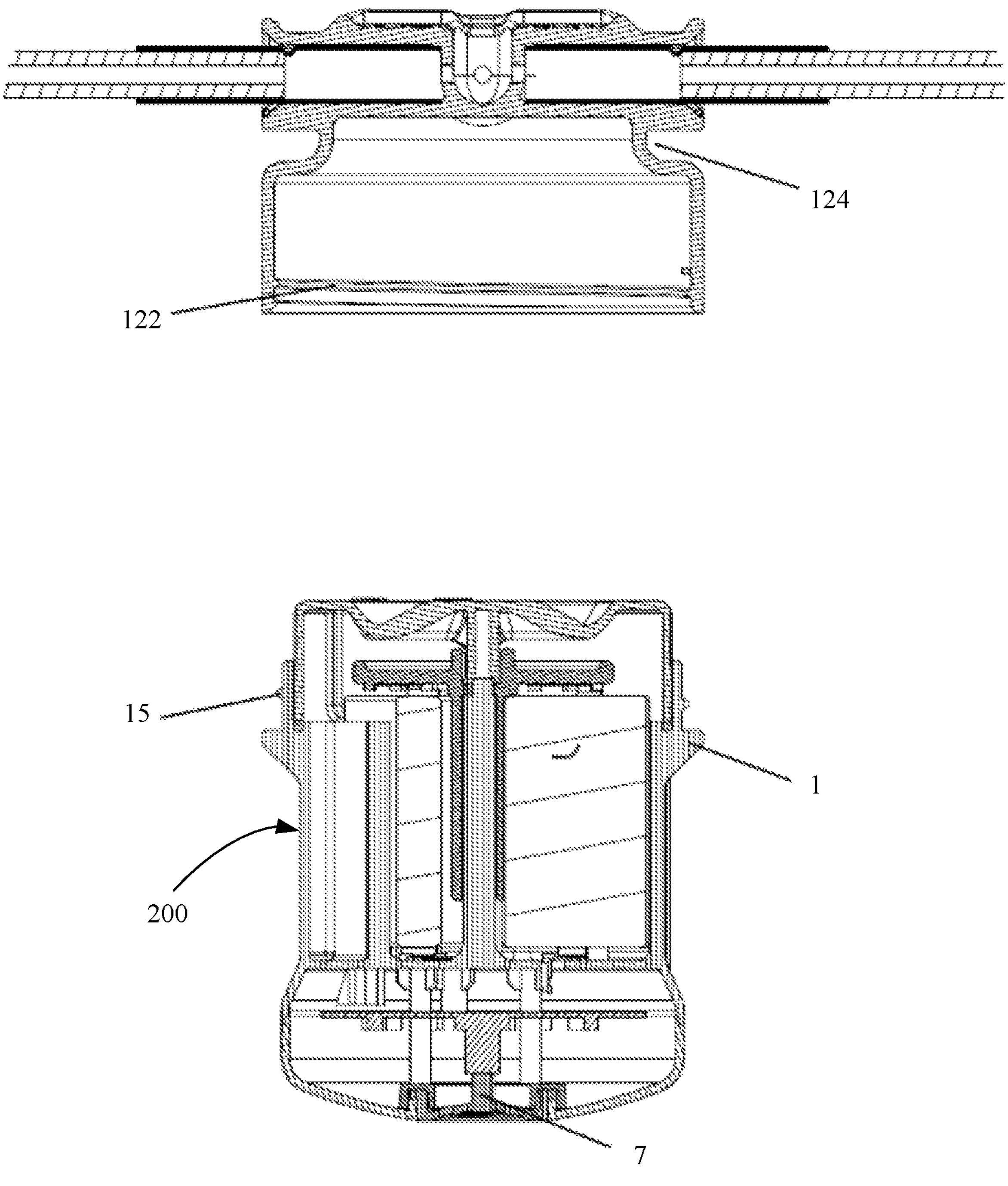
FIG. 5 is a cross-sectional view schematically illustrating the exemplary illumination device and hub of FIG. 2 disengaged from each other in accordance with exemplary embodiments of the present invention.
Figure 6:
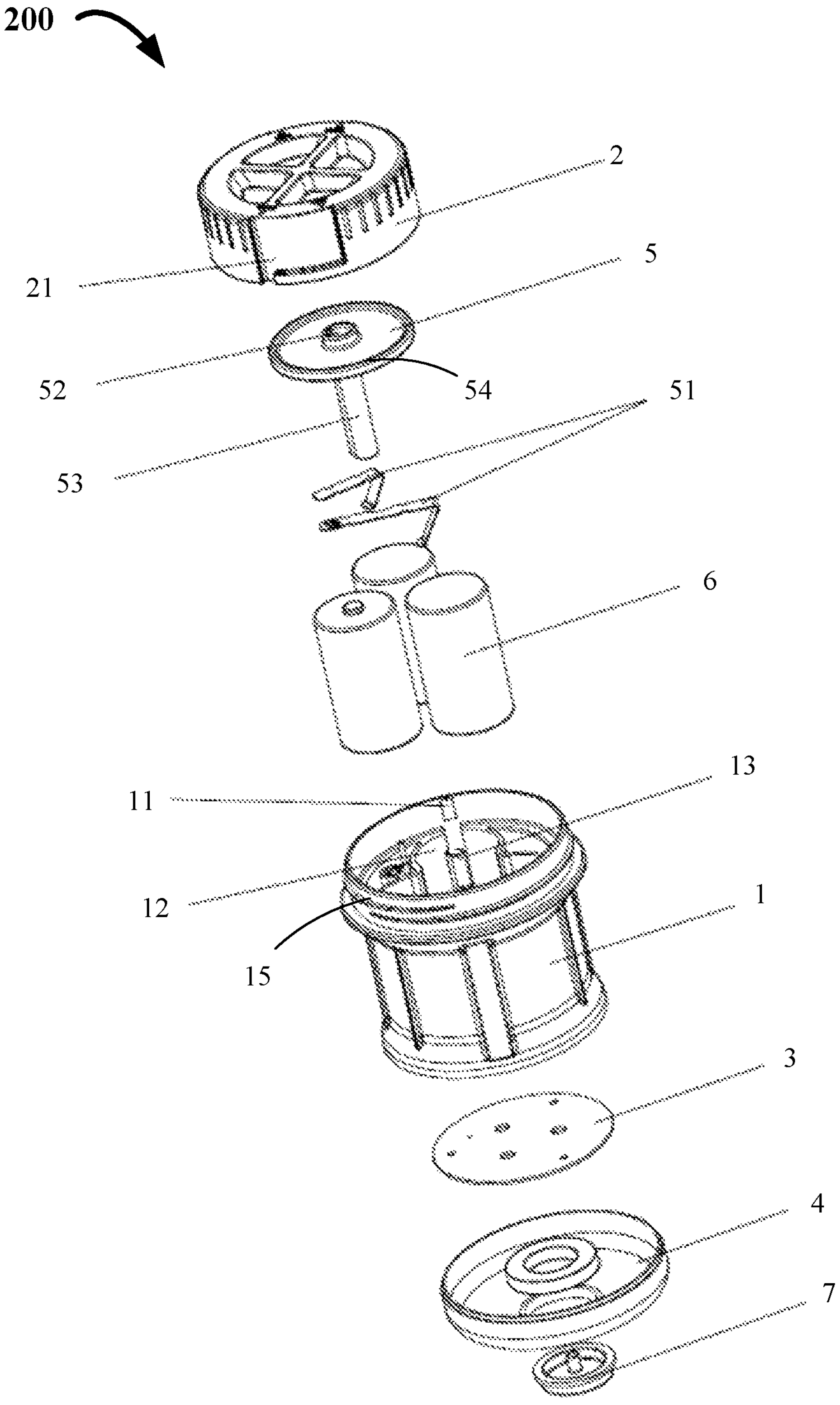
FIG. 6 is an exploded and perspective view schematically illustrating an exemplary illumination device in accordance with exemplary embodiments of the present invention.
Figure 7:
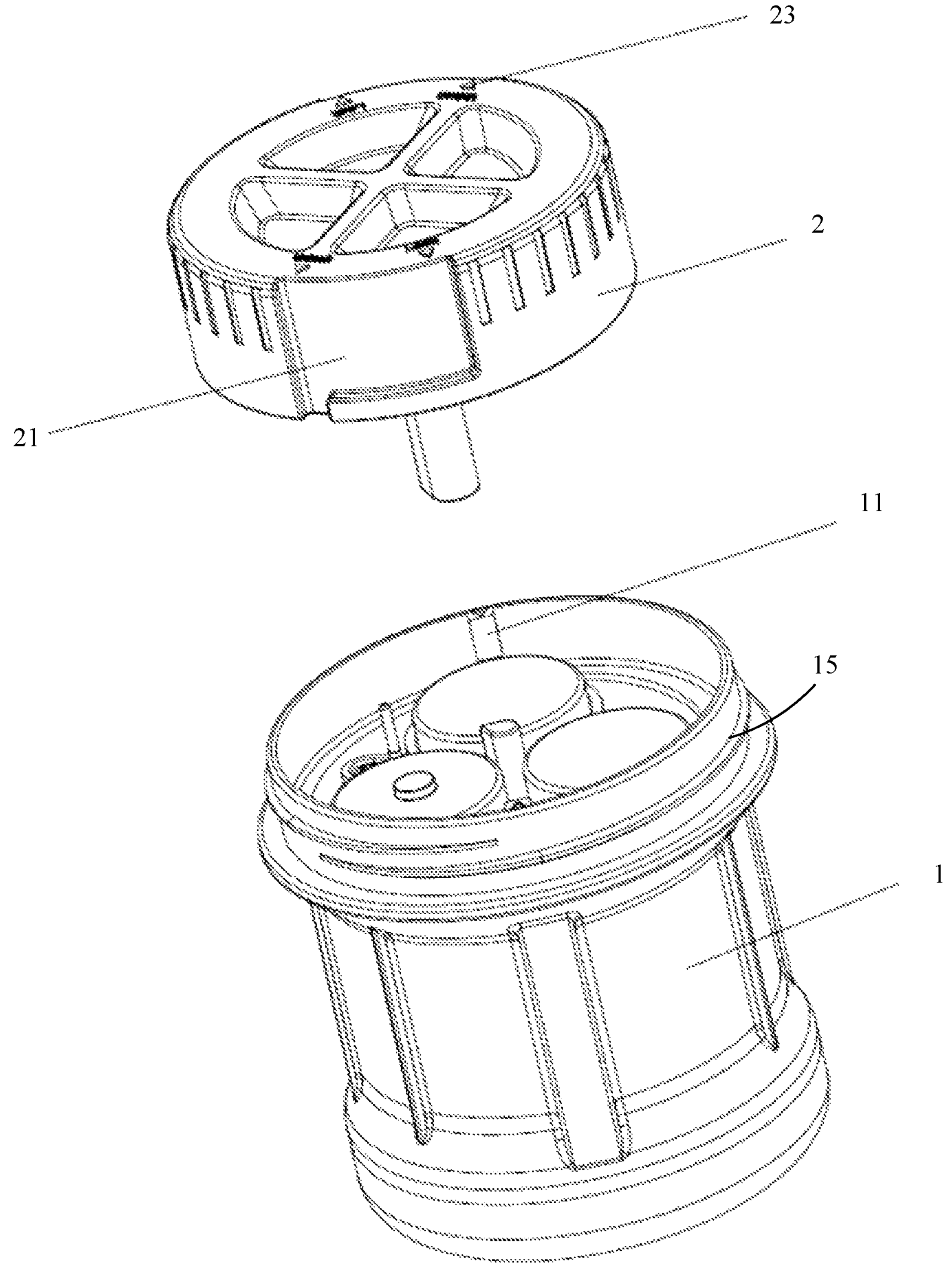
FIG. 7 is a perspective view schematically illustrating the exemplary illumination device of FIG. 6 in a partially disassembled state in accordance with exemplary embodiments of the present invention.
Figure 8:
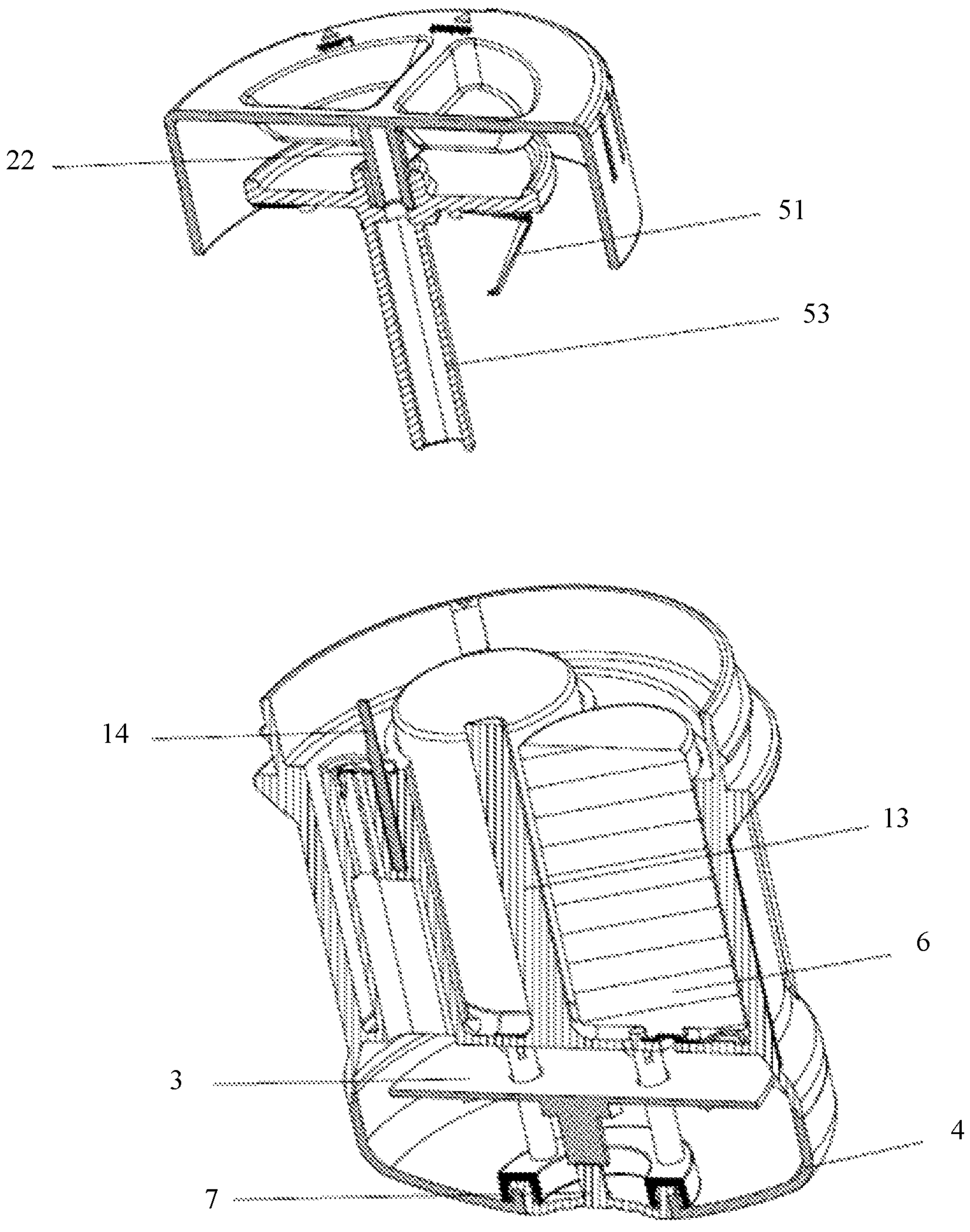
FIG. 8 is a cross-sectional view schematically illustrating the exemplary illumination device of FIG. 7.
Figure 9:
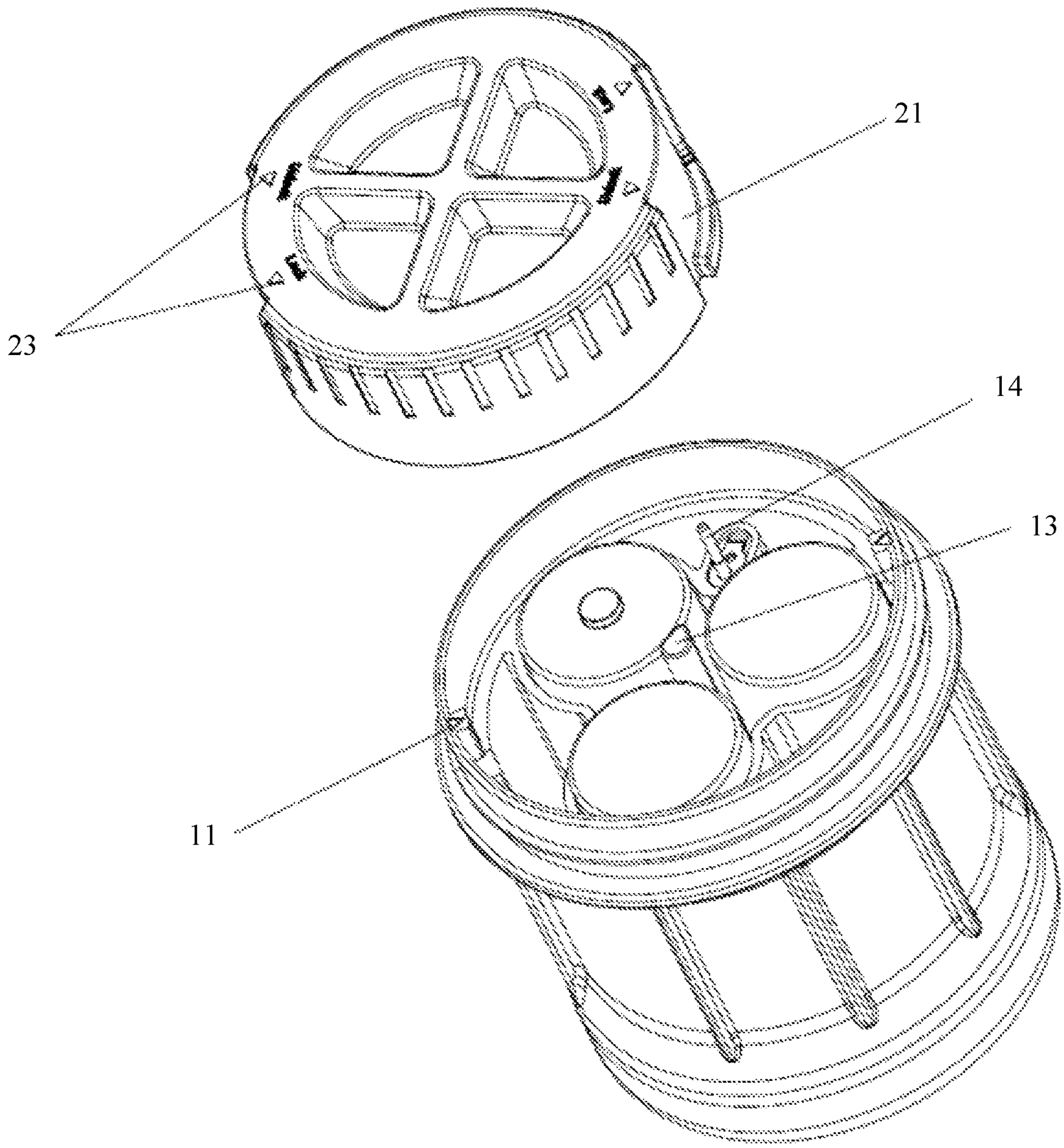
FIG. 9 is another perspective view schematically illustrating the exemplary illumination device of FIG. 6 in a partially disassembled state in accordance with exemplary embodiments of the present invention.
Figure 10:
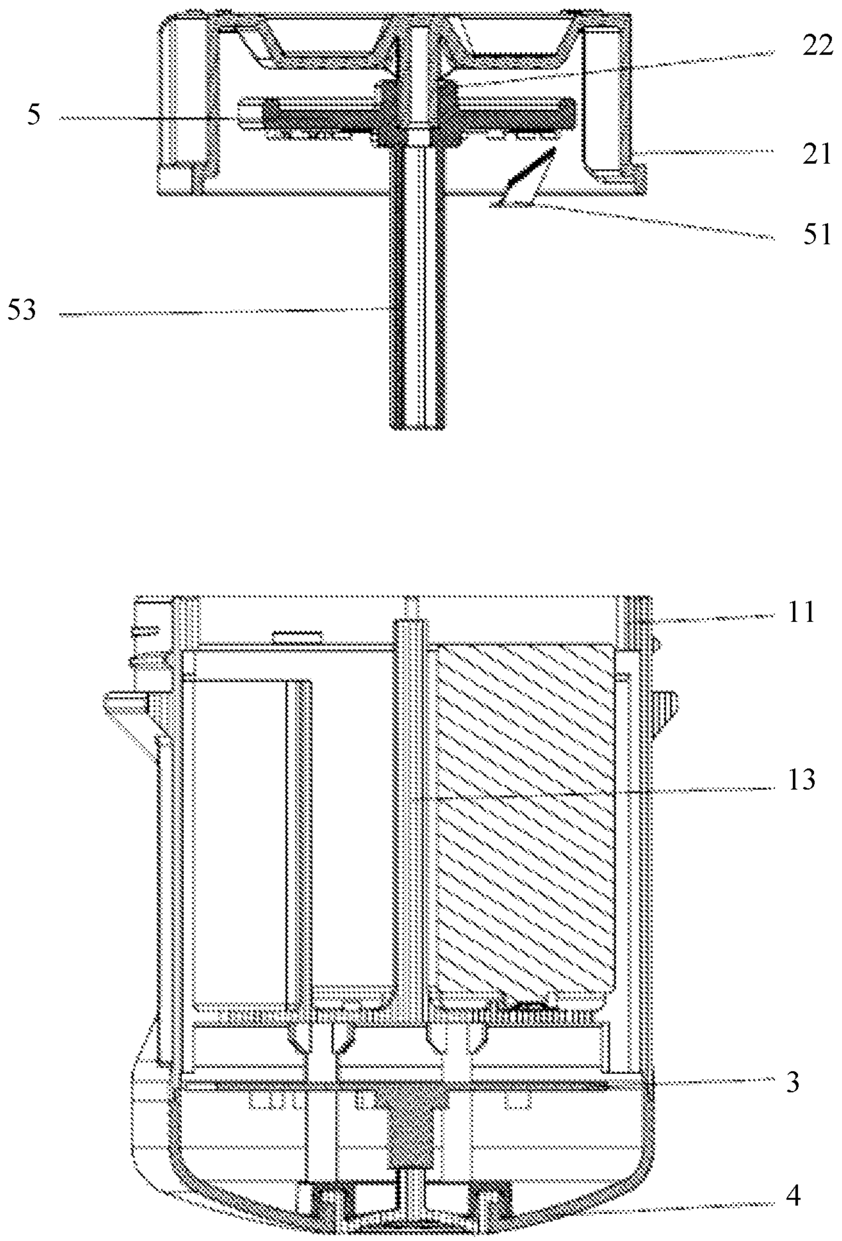
FIG. 10 is a cross-sectional view schematically illustrating the exemplary illumination device of FIG. 9.
Figure 11:
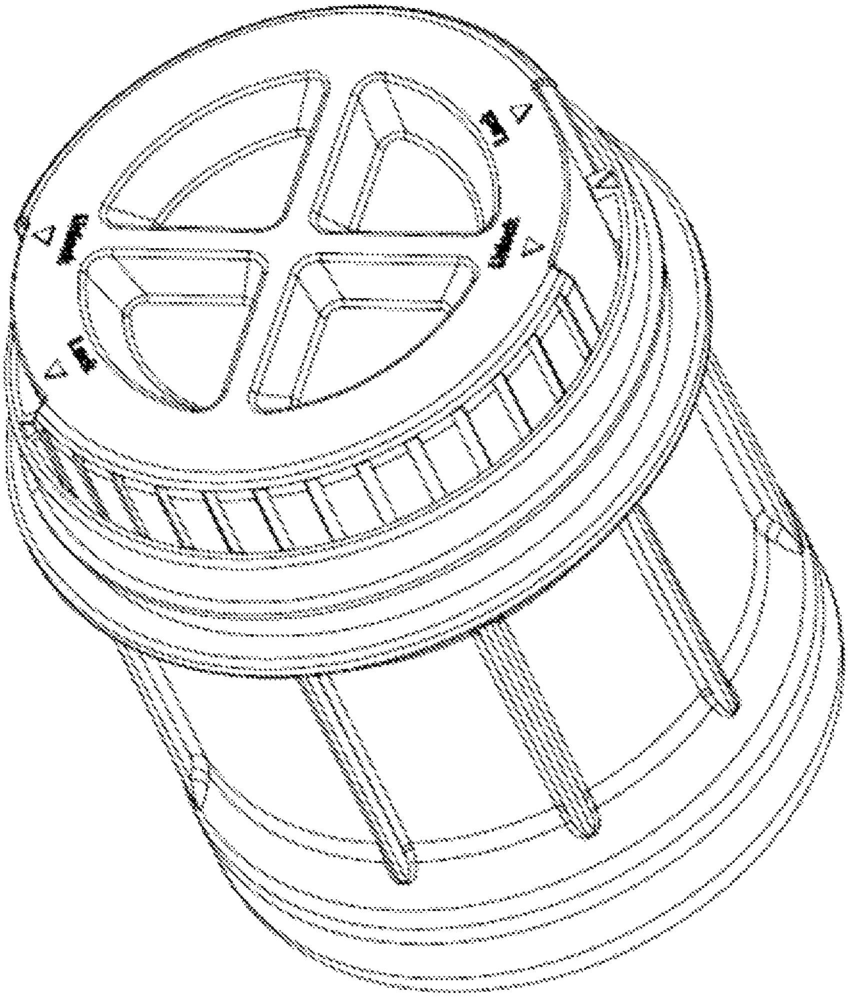
FIG. 11 is a perspective view schematically illustrating the exemplary illumination device of FIG. 6 in an assembled state in accordance with exemplary embodiments of the present invention.
Figure 12:
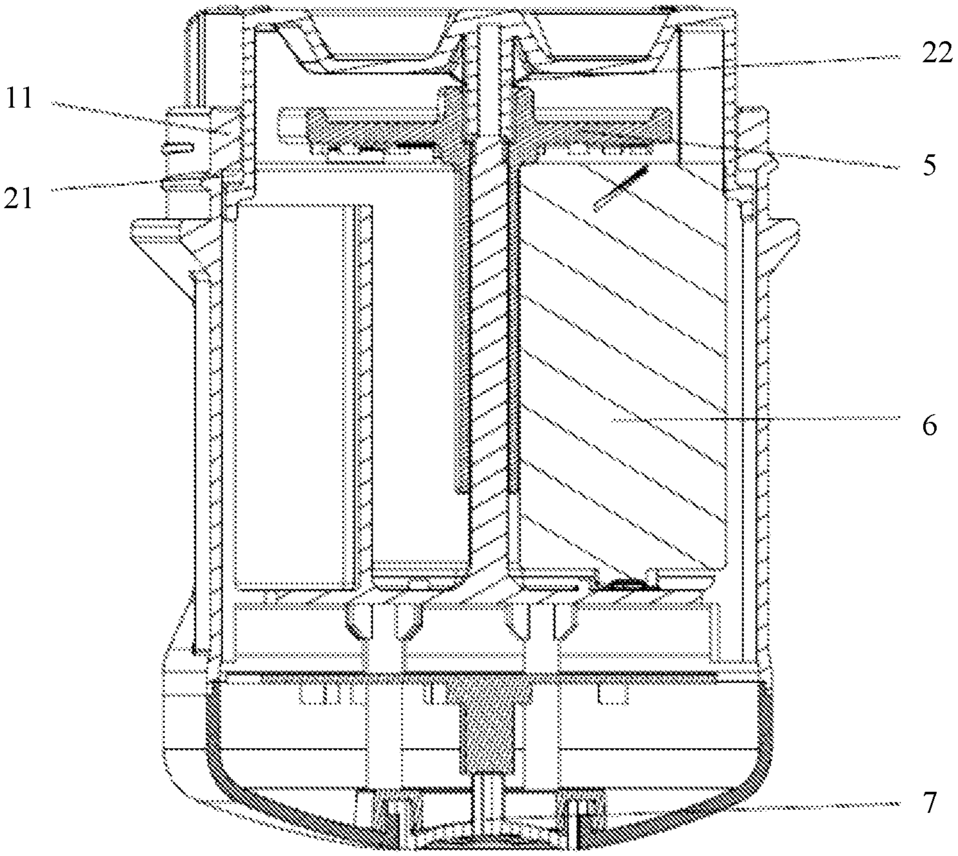
FIG. 12 is a cross-sectional view schematically illustrating the exemplary illumination device of FIG. 11.
Figure 13:
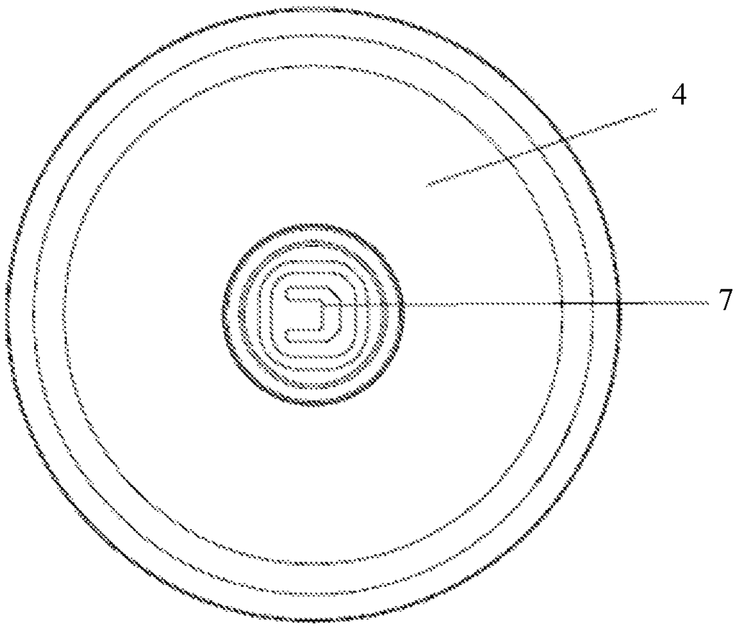
FIG. 13 is a bottom view schematically illustrating the exemplary illumination device of FIG. 6.

In some exemplary embodiments, the hub includes a plurality of sockets, such as socket 123. A socket is configured to connect or receive an end portion of a tent pole, and in some cases, to facilitate pivotal connection of a tent pole so that a tent can be folded or unfolded. A socket can be a slot, a hole, a channel, a groove, a receptacle, a bracket, or the like. Examples of sockets are disclosed in U.S. Publication Nos. 2012/0318316, 2015/0159397 and 2015/0284974, the contents of which are hereby incorporated by reference herein in their entirety. The number of sockets can be two, three, four or more, depending on the use or preference. In some exemplary embodiments, the plurality of sockers is disposed along an outer periphery of the hub, symmetrically or non-symmetrically, evenly or non-evenly. By way of example, FIGS. 2 and 4 illustrate four sockets disposed evenly along the outer periphery of the hub.

While hub 120 is illustrated to be cylindrical with a circular base, it should be noted that this is a non-limiting example. The hub can have other shapes including but not limited to square, hexagon or octagon shapes. Also, the hub can be formed of any suitable materials including but not limited to plastics, and be made of any suitable methods including but not limited to molding, casting, foaming and extrusion.

In some exemplary embodiments, an illumination device, such as illumination device 200, is detachably attached to the hub to provide illumination when needed or desired. The illumination device can be detachably attached to the hub in various ways. For instance, it can be detachably attached to the hub by fasteners, snap fittings, magnetic forces or the like. In some exemplary embodiments, the hub includes a sleeve, such as sleeve 121, configured for detachably connecting illumination device 200 with the hub. For instance, in an exemplary embodiment, the inner wall of the sleeve is provided with an internal thread 122, and the illumination device is provided with an external thread 15 that matches with the internal thread of the sleeve. As such, it is easy and convenient to screw the illumination device onto the hub when illumination is needed or desired. Similarly, it is easy and convenient to unscrew the illumination device from the hub when the tent and tent frame need to be folded.

An exemplary sleeve is generally formed at the lower portion of the hub, e.g., below the sockets when the tent is in use. An exemplary tent cloth includes a hole, such as hole 132, to allow at least a portion of the hub (e.g., lower or upper portion of the hub) to pass through. In some exemplary embodiments, the sleeve is formed with a circumferential groove, such as groove 124, recessed from an outer wall of the sleeve. The groove of the sleeve and the hole of the tent cloth are configured such that an edge of the tent cloth surrounding hole 132 is disposed within the groove to prevent wind or water leakage from the hole.

An exemplary illumination device generally includes a casing, a light source, a coupler and a cover. The casing is configured to house a battery pack. The light source is electrically connected to the battery pack, and when activated, to emit a light. The coupler is configured to electrically connect batteries when the battery pack includes multiple batteries. The cover is configured to ensure electrical connection between the batteries, and between the battery pack and the light source.

For instance, referring to FIGS. 6-13, there is depicted an exemplary illumination device 200, in accordance with some exemplary embodiments of the present invention. As shown, illumination device 200 includes a casing, such as casing 1, configured to house a battery pack, such as battery pack 6. The battery pack can include a single battery or a plurality of batteries (e.g., two, three, four or more than four batteries). By way of example, a battery pack with three batteries is illustrated. In some exemplary embodiments, the casing includes a compartment, such as compartment 12, to house the battery pack. In some exemplary embodiments, the casing includes a plurality of compartments, each for housing an individual battery of the battery pack. In some exemplary embodiments, the casing is formed with external thread 15 at an upper portion of the casing for detachably coupling the illumination device with the hub.

Illumination device 200 also includes a coupler, such as coupler 5, that are removably coupled with the casing. When coupled with the casing, the coupler electrically connects batteries in the cases where the battery pack includes multiple batteries. For instance, in some exemplary embodiments, coupler 5 includes one or more electrically-conductive elastic members, such as electrically-conductive elastic members 51, to connect the batteries. In the illustrated embodiment, two electrically-conductive elastic members are shown for connecting three batteries, with each electrically-conductive elastic member electrically connecting one battery with another battery. In some exemplary embodiments, the one or more electrically-conductive elastic members are coupled with a plate, such as plate 54, of the coupler. For instance, in an exemplary embodiment, the one or more electrically-conductive elastic members are coupled with the lower side of the plate, e.g., disposed under the plate. While the plate is illustrated with a circular shape, it should be noted that the plate can be of other regular or irregular shapes, including but not limited to oval, polygonal, or the like.

In some exemplary embodiments, for removably coupling the coupler with the casing and/or for aiding the positioning of the one or more electrically-conductive elastic members, casing 1 includes a first engagement member, such as engagement member 13, and coupler 5 includes a second engagement member, such as engagement member 53. The first and second engagement members are configured such that the second engagement member is movable with respect to the first engagement member in a first direction to facilitate engagement or disengagement of the coupler with or from the casing, and immovable with respect to the first engagement member in a second direction to prevent the one or more electrically-conductive elastic members from misaligning with the plurality of batteries.

For instance, in some exemplary embodiments, each of the first and second engagement members is elongated in the first direction, e.g., the axial direction of the casing. In a preferred embodiment, the first engagement member is formed at or adjacent to the central axis of the casing and the second engagement member is formed at or adjacent to the central axis of the first cover. In an exemplary embodiment, the first engagement member is a column structure (which can be solid, hollow or tubular) elongated in the first direction. The second engagement member is a tubular structure extended downward from the plate of the coupler and capable of sleeving onto the first engagement member and movable along the first direction. In an alternative embodiment, the second engagement member is a column structure while the first engagement member is a tubular structure capable of sleeving onto the second engagement member and movable along the first direction. In some exemplary embodiments, the column structure (e.g., engagement member 13) has a cross-section with an exterior periphery and the tubular structure (e.g., engagement member 53) has a cross-section with an interior periphery. When the tubular structure is sleeved on to the column structure, the exterior periphery of the column structure and the interior periphery of the tubular structure are coupled to each other (e.g., mate with each other) to prevent the column and tubular structures from moving with respect to each other in the second direction (e.g., the radial direction of the casing), e.g., from rotating with respect to each other. In an exemplary embodiment, the column structure or the hollow part of the tubular structure has the cross section shaped substantially the same as a cross-section of a water droplet. In some other embodiments, the column structure or the hollow part of the tubular structure has the cross section in other shapes, including but not limited to triangle, rectangle, polygon, oval, star, or the like.

In some exemplary embodiments, illuminating device 200 includes a first cover, such as cover 2, configured to be detachably connected to the casing to protect the battery pack and/or components of the illumination device. In some exemplary embodiments, the first cover is detachably snap-fitted onto the casing. For instance, in some exemplary embodiments, the casing includes one or more protrusions, such as protrusion 11, formed on an inner wall of the casing. The first cover includes one or more slots, such as slot 21, formed on an outer wall of the first cover that correspond to the one or more protrusions on the inner wall of the casing to detachably connect the first cover to the casing. In a preferable embodiment, the first cover includes two slots symmetrically formed on the outer wall of the first cover, and the casing includes two corresponding protrusions symmetrically formed on the inner wall of the casing. In an exemplary embodiment, the slot has a flag shape, i.e., having a channel at a lower side of the slot to allow insertion of the protrusion into the slot and removal of the protrusion from the slot. Once the protrusion is inserted, the slot allows the first cover to rotate with respect to the casing and consequently connect to the casing. In some exemplary embodiments, one or more marks, such as mark 23, are provided on an exterior side (e.g., the upper side) of the first cover to indicate the engagement and/or locking position of the first cover with the casing.

The first cover is movable with respect to the coupler in the first and second directions, e.g., the first cover can move toward or away from the coupler and can rotate with respect to the coupler. For instance, in some exemplary embodiments, the coupler includes a third engagement member, such as engagement member 52, disposed on an upper side of the plate (e.g., extended upward from an upper side of the plate). In an exemplary embodiment, two or more of plate 54, engagement member 52 and engagement member 53 are integrally formed together as a unitary piece. The first cover includes a fourth engagement member, such as engagement member 22 that is movable relative to the third engagement member in the first and second directions. In an exemplary embodiment, the third engagement member is a convex column and the fourth engagement member is a circular groove to receive the third engagement member. In an alternative embodiment, the fourth engagement member is a convex column and the third engagement member is a circular groove to receive the fourth engagement.

As the first cover rotates to engage with the casing, the fourth engagement member of the first cover rotates with respect to the third engagement member of the coupler and at the same time advances toward the third engagement member of the coupler. Because the first cover is configured to be rotatable with respect to the coupler, and the coupler is configured to be non-rotatable with respect to the casing, engaging the first cover with the casing will not affect the alignment of the one or more electrically-conductive elastic members with the plurality of batteries. When the first cover is connected to the casing (e.g., in full engagement with the casing), the fourth engagement member of the first cover engages with the third engagement member of the coupler, and pushes the coupler in the first direction (e.g., the axial direction of the casing) toward the battery pack. As a result, when the first cover is connected to the casing, the one or more electrically-conductive elastic members are pressed against the plurality of batteries, thereby ensuring good electrical connection between the batteries.

Illumination device 200 also includes a light source, such as light source 3, configured to emit a light when electrically connected to the battery pack. As such, the light source can provide illumination, e.g., to the interior of the tent or the like, when the tent is unfolded or when desired (e.g., at night). In some exemplary embodiments, the light source includes one or more light emitting diodes (LEDs), such as LED 31. The one or more LEDs can be of any suitable types, shapes, or sizes, and can emit light in any colors. In an exemplary embodiment, the one or more LEDs emit collectively a white light. In some exemplary embodiments, the light source includes a board, such as board 32. The board is coupled to the casing (e.g., coupled to the lower side of the casing) and configured for mounting or positioning the LEDs. In some exemplary embodiments, the board is a LED board or a printed circuit board (PCB) having conductive features such as conductive tracks or pads. In such embodiments, the LEDs are electrically connected to the battery pack through the conductive features of the LED or PCB board.

In some exemplary embodiments where the battery pack includes multiple batteries, the batteries are not necessarily positioned with the same orientation, e.g., positive and negative electrodes are not necessarily on the same side. To enable the series connection of the batteries, in some exemplary embodiments, an electrically-conductive probe, such as probe 14, is provided in the casing. When the first cover is connected to the casing, the electrically-conductive probe and the one or more electrically-conductive elastic members of the coupler electrically connects the battery pack with the light source (e.g., the conductive features of the LED or PCB board). In some exemplary embodiments, the electrically-conductive probe is also elastic. As such, when the first cover is connected to the casing, the fourth engagement member of the first cover pushes the coupler in the first direction toward the battery pack. The coupler in turn presses the electrically-conductive probe to prevent the electrically-conductive probe from loosening and/or disconnecting.

Illumination device 200 can include additional, optional or alternative components. For instance, in some exemplary embodiments, the illumination device includes a second cover, such as cover 4, coupled with the casing to protect the light source. In some exemplary embodiments, the second cover is coupled with the lower portion of the casing and encases, along with the casing, the light source. The second cover is at least partially transparent, e.g., made of a material that is at least transparent to the light emitted by the light source. In some exemplary embodiments, the second cover is also configured to at least partially diffuse the light emitted by the light source and thus provide soft light to the interior of the tent.

In some exemplary embodiments, the illumination device includes a switch, such as switch 7, electrically connected to the light source to allow a user to control the light source, e.g., turning on or off the light. The switch is accessible from outside of the illumination device, e.g., from the bottom of the illumination device. In an exemplary embodiment, at least a portion of the switch is exposed to outside of the illumination device through a hole formed at the second cover.

While illumination device 200 is illustrated to be cylindrical with a substantially circular cross section, it should be noted that this is a non-limiting example. The illumination device, as well as its individual components (e.g., casing 1, cover 2, light source 3, cover 4, coupler 5 and/or switch 7) can have other shapes. For instance, light source 3 can be of other regular or irregular shapes, including but not limited to oval, square, rectangle, or the like. switch 7 can be a button, a toggle, a software application (e.g., an APP in wireless communication with the LED or PCB board), or the like.

As disclosed herein, the illumination device, tent frame and tent of the present disclosure have several advantages. For instance, the illumination device of the present invention can prevent misalignment of the electrically-conductive elastic members and thus ensure proper electrical connections to provide illumination when desired. Moreover, the illumination device of the present invention can be quickly, easily, and detachably connected to the tent. It is convenient to use, does not interfere with the folding and unfolding of the tent or tent frame, does not affect the overall appearance of the tent or tent frame, and does not affect the size of the folded tent or tent frame. In addition, the illumination device of the present invention allows easy replacement of batteries when needed.

Terminologies and References Cited

The terminology used herein is for the purpose of describing particular implementations only and is not intended to be limiting of the claims. As used in the description of the implementations and the appended claims, the singular forms “a”, “an” and “the” are intended to include the plural forms as well, unless the context clearly indicates otherwise. It will be understood that the terms “left” or “right”, “top” or “bottom”, “lower” or “upper”, “interior” or “exterior”, and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without changing the meaning of the description, so long as the "first element" and the "second element" are renamed consistently.

As used herein, the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A tent frame comprising:

a plurality of tent poles;

a hub connecting two or more tent poles in the plurality of tent poles;

an illumination device detachably connected to the hub, the illumination device comprising:

a casing to house a battery pack having a plurality of batteries, the casing comprising a first engagement member;

a light source configured to emit a light when electrically connected to the battery pack;

a coupler comprising a second engagement member corresponding to the first engagement of the casing, and one or more electrically-conductive elastic members for electrically connecting the plurality of batteries; and a first cover detachably connected to the casing;

wherein:

the second engagement member is movable with respect to the first engagement member in a first direction to facilitate engagement of the coupler with the casing or disengagement of the coupler from the casing;

the second engagement member is immovable with respect to the first engagement member in a second direction to prevent the one or more electrically-conductive elastic members from misaligning with the plurality of batteries;

the first cover is movable with respect to the coupler in the first and second directions, wherein when connected to the casing, the first cover pushes the coupler in the first direction toward the battery pack, thereby pressing the one or more electrically-conductive elastic members against the plurality of batteries to ensure electrical connection.

2. The tent frame of claim 1, further comprising:

an electrically-conductive probe disposed in the casing, wherein when the first cover is connected to the casing, the electrically-conductive probe, together with the one or more electrically-conductive elastic members of the coupler, electrically connects the battery pack with the light source.

3. The tent frame of claim 1, wherein the illumination device is detachably connected to the hub by fasteners, threads, snap-fitting, magnetic force, or any combination thereof.

4. The tent frame of claim 3, wherein the hub comprises a sleeve formed with an internal thread and the casing of the illumination device comprises an external thread for detachably connecting the illumination device to the hub.

5. The tent frame of claim 4, wherein the sleeve comprises a circumferential groove recessed from an outer wall of the sleeve to receive an edge of a tent cloth to prevent wind or water leakage.

6. The tent frame of claim 1, wherein each of the first and second engagement members is elongated in the first direction, and when attached, the first and second engagement members are restricted from rotating relative to each other in the second direction.

7. The tent frame of claim 6, wherein one of the first and second engagement members has a cross section with an exterior periphery and the other of the first and second engagement members has a cross section with an interior periphery that mates with the exterior periphery.

8. The tent frame of claim 7, wherein the cross-section of the one of the first and second engagement members has a substantially water drop shape.

9. The tent frame of claim 1, wherein the first cover is snap-fitted onto the casing.

10. The tent frame of claim 9, wherein the casing comprises one or more protrusions on an inner wall of the casing, and the first cover comprises one or more slots on an outer wall of the first cover for detachably connecting the first cover to the casing when the first cover is connected to the casing.

11. The tent frame of claim 1, wherein the coupler comprises a third engagement member, and the first cover comprises a fourth engagement member that is movable relative to the third engagement member in the first and second directions.

12. The tent frame of claim 11, wherein one of the third and fourth engagement members is a convex column and the other one of the third and fourth engagement members is a circular groove to receive the convex column.

13. The tent frame of claim 1, further comprising a second cover coupled with the casing to protect the light source, wherein the second cover is at least partially transparent to the light emitted by the light source.

14. The tent frame of claim 1, further comprising a switch electrically connected to the light source to allow a user to control the light source.

15. A tent comprising:

a tent frame of claim 1, wherein the hub of the tent frame comprises a sleeve for detachably connecting the illumination device; and a tent cloth comprising a hole to allow the sleeve of the hub to pass through.

16. The tent of claim 15, wherein the sleeve comprises a circumferential groove on an outer wall of the sleeve and configured in accordance with the hole of the tent cloth to prevent wind or water leakage.

17. A tent frame comprising:

a plurality of tent poles;

a hub connecting two or more tent poles in the plurality of tent poles;

an illumination device detachably connected to the hub, the illumination device comprising:

a casing configured to house a battery pack having a plurality of batteries, the casing comprising a first engagement member;

a light source configured to emit a light when electrically connected to the battery pack;

a coupler comprising a plate, a second engagement member extended downward from a lower side of the plate, one or more electrically-conductive elastic members coupled with the lower side of the plate, and a third engagement member extended upward from an upper side of the plate; and a first cover detachably connected to the casing, the first cover comprising a fourth engagement member extended downward from a side of the first cover facing the coupler;

wherein:

the second engagement member is movable with respect to the first engagement member in a first direction to facilitate engagement or disengagement of the coupler with or from the casing;

the second engagement member is immovable with respect to the first engagement member in a second direction to prevent the one or more electrically-conductive elastic members from misaligning with the plurality of batteries; and when the first cover is connected to the casing, the fourth engagement member is engaged with the third engagement member to push the coupler in the first direction toward the battery pack, thereby pressing the one or more electrically-conductive elastic members against the plurality of batteries to ensure electrical connection.

18. An illumination device for a tent frame, wherein the tent frame comprises a plurality of tent poles and a hub connecting two or more tent poles in the plurality of tent poles, the illumination device comprising:

a casing configured to detachably connect to the hub and house a battery pack having a plurality of batteries, the casing comprising a first engagement member;

a light source configured to emit a light when electrically connected to the battery pack;

a coupler comprising a plate, a second engagement member extended downward from a lower side of the plate, one or more electrically-conductive elastic members coupled with the lower side of the plate, and a third engagement member extended upward from an upper side of the plate; and a first cover detachably connected to the casing, the first cover comprising a fourth engagement member extended downward from a side of the first cover facing the coupler;

wherein:

the second engagement member is movable with respect to the first engagement member in a first direction to facilitate engagement or disengagement of the coupler with or from the casing;

the second engagement member is immovable with respect to the first engagement member in a second direction to prevent the one or more electrically-conductive elastic members from misaligning with the plurality of batteries; and when the first cover is connected to the casing, the fourth engagement member is engaged with the third engagement member to push the coupler in the first direction toward the battery pack, thereby pressing the one or more electrically-conductive elastic members against the plurality of batteries to ensure electrical connection.

19. The illumination device of claim 18, further comprising:

an electrically-conductive probe disposed in the casing, wherein when the first cover is connected to the casing, the electrically-conductive probe, together with the one or more electrically-conductive elastic members of the coupler, electrically connects the battery pack with the light source.

20. The illumination device of claim 18, wherein each of the first and second engagement members is elongated in the first direction, and when attached, the first and second engagement members are restricted from rotating relative to each other in the second direction; and one of the first and second engagement members has a cross section with an exterior periphery and the other of the first and second engagement members has a cross section with an interior periphery that mates with the exterior periphery.

* * * * *